(12) United States Patent
Axén et al.

(10) Patent No.: US 10,028,160 B2
(45) Date of Patent: Jul. 17, 2018

(54) NETWORK NODE, WIRELESS DEVICE AND METHODS FOR HANDLING EVALUATION OF A SECONDARY CELL FOR A WIRELESS DEVICE

(71) Applicant: Telefonaktiebolaget LM Ericsson (publ), Stockholm (SE)

(72) Inventors: Rasmus Axén, Linköping (SE); Stefan Johansson, Linköping (SE); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/038,615

(22) PCT Filed: Dec. 12, 2013

(86) PCT No.: PCT/SE2013/051497
§ 371 (c)(1),
(2) Date: May 23, 2016

(87) PCT Pub. No.: WO2015/088408
PCT Pub. Date: Jun. 18, 2015

(65) Prior Publication Data
US 2016/0295444 A1   Oct. 6, 2016

(51) Int. Cl.
*H04B 17/00* (2015.01)
*H04W 24/10* (2009.01)
(Continued)

(52) U.S. Cl.
CPC ......... *H04W 24/10* (2013.01); *H04B 17/309* (2015.01); *H04L 5/001* (2013.01)

(58) Field of Classification Search
CPC . H04W 24/10; H04W 48/00; H04W 28/0226; H04W 52/40; H04B 17/309; H04L 5/001
(Continued)

(56) References Cited

U.S. PATENT DOCUMENTS

| 4,608,711 A | * | 8/1986 | Goldman | .............. H04W 36/30 455/436 |
| 5,448,569 A | * | 9/1995 | Huang | .................. H04B 1/713 370/332 |

(Continued)

FOREIGN PATENT DOCUMENTS

| WO | 2009088332 A1 | 7/2009 |
| WO | 2011157224 A1 | 12/2011 |

(Continued)

OTHER PUBLICATIONS

Ericsson, et al., "Tdoc R2-103092: Carrier Aggregation and the s-Measure criterion," 3rd Generation Partnership Project (3GPP), TSG-RAN WG2 #69bis, May 10-14, 2010, 4 pages, Montreal, Canada.

(Continued)

*Primary Examiner* — Edward Urban
*Assistant Examiner* — Max Mathew
(74) *Attorney, Agent, or Firm* — Withrow & Terranova, PLLC (57) ABSTRACT

A method in a network node for handling evaluation of a secondary cell for a wireless device. The method comprises establishing a first level of coverage of the secondary cell, based on a first measurement report received from the wireless device, which first measurement report relates to a quality of a signal of the secondary cell. The method further comprises determining an evaluation frequency, based on the established first level of coverage of the secondary cell, which evaluation frequency relates to how frequently a level of coverage of the secondary cell shall be evaluated. The method further comprises sending a configuration to the wireless device, which configuration relates to an evaluation of a second level of coverage of the secondary cell, and (Continued)

which configuration is based on the determined evaluation frequency.

18 Claims, 5 Drawing Sheets

(51) Int. Cl.
   *H04L 5/00* (2006.01)
   *H04B 17/309* (2015.01)
(58) Field of Classification Search
   USPC .................................................. 455/67.11
   See application file for complete search history.

(56) References Cited

U.S. PATENT DOCUMENTS

| 2011/0269449 | A1* | 11/2011 | Kazmi | H04B 7/024 |
| | | | | 455/422.1 |
| 2012/0250743 | A1* | 10/2012 | Heath | H04B 7/022 |
| | | | | 375/219 |
| 2012/0309396 | A1* | 12/2012 | Aoyagi | H04W 36/0088 |
| | | | | 455/436 |
| 2013/0273919 | A1* | 10/2013 | Sashihara | H04W 36/0094 |
| | | | | 455/436 |
| 2013/0344871 | A1* | 12/2013 | Kallin | H04W 36/30 |
| | | | | 455/436 |
| 2014/0200016 | A1* | 7/2014 | Siomina | H04W 24/08 |
| | | | | 455/450 |
| 2014/0355573 | A1* | 12/2014 | Wong | H04W 72/0446 |
| | | | | 370/336 |
| 2015/0195763 | A1* | 7/2015 | Chen | H04W 36/18 |
| | | | | 455/436 |
| 2017/0048780 | A1* | 2/2017 | Qi | H04W 36/30 |
| 2017/0099631 | A1* | 4/2017 | Kim | H04W 24/10 |

FOREIGN PATENT DOCUMENTS

| WO | 2012154112 A1 | 11/2012 |
| WO | 2013002693 A1 | 1/2013 |
| WO | 2013020656 A1 | 2/2013 |
| WO | 2013022061 A1 | 2/2013 |
| WO | 2013148234 A1 | 10/2013 |

OTHER PUBLICATIONS

European Search Report for European Patent Application No. 13899219.3, dated Oct. 5, 2016, 5 pages.
Author Unknown, "3rd Generation Partnership Project; Technical Specification Group Radio Access Network; Evolved Universal Terrestrial Radio Access (E-UTRA); Radio Resource Control (RRC); Protocol specification (Release 10)," Technical Specification 36.331, Version 10.10.0, 3GPP Organizational Partners, Jun. 2013, 307 pages.
Author Unknown, "3rd Generation Partnership Project; Technical Specification Group Radio Access Network; Evolved Universal Terrestrial Radio Access (E-UTRA); Radio Resource Control (RRC); Protocol specification (Release 11)," Technical Specification 36.331, Version 11.5.0, 3GPP Organizational Partners, Sep. 2013, 347 pages.
International Search Report and Written Opinion for International Patent Application No. PCT/SE2013/051497, dated Oct. 6, 2014, 10 pages.

* cited by examiner

NETWORK NODE, WIRELESS DEVICE AND METHODS FOR HANDLING EVALUATION OF A SECONDARY CELL FOR A WIRELESS DEVICE

This application is a 35 U.S.C. § 371 national phase filing of International Application No. PCT/SE2013/051497, filed Dec. 12, 2013, the disclosure of which is incorporated herein by reference in its entirety.

TECHNICAL FIELD

Embodiments herein relate to a network node and a wireless device, and methods in the network node and the wireless device. In particular they relate to handling evaluation of a secondary cell for a wireless device.

BACKGROUND

Communication devices such as wireless devices are also known as e.g. user equipments (UE), mobile terminals, wireless terminals, and/or mobile stations. Wireless devices are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the cellular communications network.

Wireless devices may further be referred to as mobile telephones, cellular telephones, laptops, tablet computers or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

The cellular communications network covers a geographical area which is divided into cell areas, wherein each cell area being served by an network node. A cell is the geographical area where radio coverage is provided by the network node.

The network node may e.g. be a base station such as a Radio Base Station (RBS), eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size.

Further, each network node may support one or several communication technologies. The network nodes communicate over the air interface operating on radio frequencies with the wireless terminals within range of the network node. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission in LTE is controlled by the radio base station. Upon the demand on higher bandwidth and higher data rate applications, LTE-Advanced as of 3GPP Release 10 introduces Carrier Aggregation (CA).

Carrier Aggregation allows expansion of effective bandwidth delivered to a wireless device through concurrent utilization of radio resources across multiple carriers. This means that several Component Carriers (CCs) may be aggregated to form a larger overall transmission bandwidth. A wireless device that is CA capable may be configured with multiple component carriers, corresponding to multiple serving cells, from the same network node. Then, the wireless device with reception and/or transmission capabilities for carrier aggregation may simultaneously receive and/or transmit on these multiple component carriers originating from the same network node. Carrier Aggregation is supported for both contiguous and non-contiguous component carriers.

It is possible to configure a wireless device to aggregate a different number of component carriers originating from the same network node and of possibly different bandwidths in the UL and the DL. The number of DL component carriers that may be configured depends on the DL aggregation capability of the wireless device. The number of UL component carriers that may be configured depends on the UL aggregation capability of the wireless device. Component carriers originating from the same network node need not to provide the same coverage.

As mentioned above, each component carrier corresponds to a serving cell. Thus, the wireless device may have multiple serving cells, each serving cell operating on a respective component carrier.

The wireless device may connect to one primary serving cell (PCell), served by a Primary Component Carrier (PCC), originating from a serving network node, such as an eNB. The primary serving cell may also be referred to as a primary cell. Additionally, the wireless device may also connect to one or several secondary serving cells (SCells). The secondary serving cells may also be referred to as secondary cells. Each secondary cell is served by a corresponding Secondary Component Carrier (SCC), originating from the same network node as the PCC. The PCC may be regarded as the anchor carrier for the wireless device and is thus used for basic functionalities such as radio link failure monitoring. The Radio Resource Control (RRC) connection is handled by the secondary cell, served by the PCC. After connection establishment, one or several secondary cells may be configured and activated, to provide additional radio resources.

The secondary cells are added and removed as required, while the primary cell is only changed at handover. If a component carrier is activated, it may be used for data transmission to the wireless device. Configured component carriers are candidates for activation. That is, based on the arrival of a significant amount of data, one or more of the configured component carriers may be activated.

Via RRC signaling, the wireless device may indicate to a serving network node its capability to support one or more secondary cells in the downlink, as well as one or more secondary cells in the uplink. The serving network node may alternatively receive information from a different network node about the capability of the wireless device to support one or more secondary cells.

In many scenarios, the configuration of the wireless device and the actions taken by the network node are dependent on a level of coverage of the component carriers available for the wireless device. The network node may establish a level of coverage of a component carrier, and the serving cell served by that component carrier, based on measurements performed by the wireless device.

Typically the wireless device continuously performs intra-frequency measurements, to always search for the most suitable serving cell. Inter-frequency measurements are generally only performed when explicitly needed. The main reason for this is that inter-frequency measurements normally require measurement gaps. A measurement gap is a period during which no transmission and reception happens. Measurements requiring measurement gaps may affect the performance of the wireless device as well as battery consumption. Continuous use of measurement gaps may also increase the drop rate.

With the introduction of carrier aggregation there is an increased need for inter-frequency measurements to find suitable secondary cells. In case no suitable secondary cell is available, these measurements only decrease the performance of the wireless device, to no gain.

SUMMARY

It is therefore an object of embodiments herein to enhance the performance in a wireless communications network using carrier aggregation.

According to a first aspect of embodiments herein, the object is achieved by a method in a network node for handling evaluation of a secondary cell for a wireless device. The network node establishes a first level of coverage of the secondary cell, based on a first measurement report received from the wireless device, which first measurement report relates to a quality of a signal of the secondary cell. The network node determines an evaluation frequency, based on the established first level of coverage of the secondary cell, which evaluation frequency relates to how frequently a level of coverage of the secondary cell shall be evaluated. The network node sends a configuration to the wireless device, which configuration relates to an evaluation of a second level of coverage of the secondary cell, and which configuration is based on the determined evaluation frequency.

According to a second aspect of embodiments herein, the object is achieved by a method in a wireless device for handling evaluation of a secondary cell for the wireless device. The wireless device sends a first measurement report to a network node, for enabling the network node to establish a first level of coverage of the secondary cell, which first measurement report relates to a quality of a signal of the secondary cell. The wireless device receives a configuration from the network node, which configuration relates to an evaluation of a second level of coverage of the secondary cell, and which configuration is based on an evaluation frequency. The evaluation frequency is based on the established first level of coverage of the secondary cell, and relates to how frequently a second level of coverage of the secondary cell shall be evaluated.

According to a third aspect of embodiments herein, the object is achieved by a network node for handling evaluation of a secondary cell for a wireless device. The network node is configured to establish a first level of coverage of the secondary cell, based on a first measurement report received from the wireless device. The first measurement report relates to a quality of a signal of the secondary cell. The network node is further configured to determine an evaluation frequency, based on the established first level of coverage of the secondary cell. The evaluation frequency relates to how frequently a level of coverage of the secondary cell shall be evaluated. The network node is further configured to send a configuration to the wireless device. The configuration relates to an evaluation of a second level of coverage of the secondary cell. The configuration is based on the determined evaluation frequency.

According to a fourth aspect of embodiments herein, the object is achieved by a wireless device for handling evaluation of a secondary cell for the wireless device. The wireless device is configured to send a first measurement report to a network node, for enabling the network node to establish a first level of coverage of the secondary cell. The first measurement report relates to a quality of a signal of the secondary cell. The wireless device is also configured to receive a configuration from the network node. The configuration relates to an evaluation of a second level of coverage of the secondary cell. The configuration is based on an evaluation frequency. The evaluation frequency is based on the established first level of coverage of the secondary cell. The evaluation frequency relates to how frequently a second level of coverage of the secondary cell shall be evaluated.

An advantage with embodiments herein is that a dynamical way of determining how frequently a level of coverage of a secondary cell shall be evaluated is introduced. Since the evaluation frequency to be used when evaluating the level of coverage of the secondary cell is based on an established first level of coverage of the secondary cell, the wireless device may be configured to evaluate a secondary cell more or less often, depending on the level of coverage of the secondary cell.

The introduction of an evaluation frequency which is based on the level of coverage of the secondary cell thus makes it possible to increase the frequency used for evaluating a secondary cell when the level of coverage is high, and the chance of finding a suitable secondary cell is likely. Correspondingly, it is made possible to decrease the frequency used for evaluating a secondary cell, when the level of coverage is low, and the chance of finding a suitable secondary cell is less likely.

In this way the power consumption of the wireless device may be reduced, as compared to a solution using a static evaluation frequency. Furthermore the network performance is improved, since the signalling between the wireless device and the serving network node is better adapted to the need for carrier aggregation as compared to a solution in which a static evaluation frequency is used.

BRIEF DESCRIPTION OF THE DRAWINGS

Examples of embodiments herein are described in more detail with reference to attached drawings in which.

DETAILED DESCRIPTION

Figure 1:
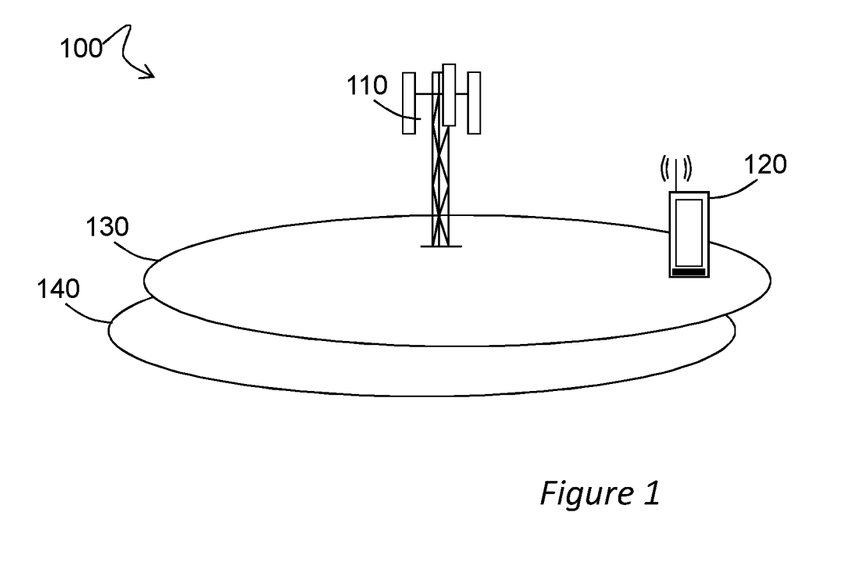
FIG. 1 schematically illustrates embodiments of a wireless communications network.

FIG. 1 depicts an example of a wireless communications network 100 according to a first scenario in which embodiments herein may be implemented. The wireless communications network 100 is a wireless communication network such as an LTE-Advanced network. The embodiments may also be implemented in other networks that have adopted carrier aggregation, such as a Universal Terrestrial Radio Access Network (UTRAN) and WiFi, but also networks adopting aggregation of carriers using different radio access technologies, as well as aggregation of carriers served by two or more different serving network nodes.

The wireless communications network 100 depicted in FIG. 1 comprises a network node 110. The network node 110 may be a transmission point such as a radio base station, for example an eNB, an eNodeB, or an Home Node B, an Home eNode B or any other network node capable to serve a wireless device such as a user equipment or a machine type communication device in a wireless communications network. The network node may also act as a master node to one or more secondary network nodes, where a secondary node also serves a wireless device.

The network node 110 provides radio coverage to several cells by means of several component carriers.

A wireless device 120 operates in the wireless communications network 100. The wireless device 120 is served by a primary cell 130, corresponding to a first component carrier of the network node 110.

The wireless device 120 is capable of using carrier aggregation, and may thus be configured to receive and/or transmit on multiple component carriers of the network node 110. The wireless device 120 may e.g. be a user equipment, a mobile wireless terminal or a wireless terminal, a mobile phone, a computer such as e.g. a laptop, a Personal Digital Assistant (PDA) or a tablet computer, sometimes referred to as a surf plate, with wireless capability, or any other radio network unit capable to communicate over a radio link in a wireless communications network. Please note the term wireless device used in this document also covers other wireless devices such as Machine to machine (M2M) devices.

Embodiments herein may address scenarios in which a level of coverage of the first cell 130, as seen from the wireless device's 120 point of view, is good enough to allow the wireless device 120 to start searching for a secondary cell 140. In order to ensure that the level of coverage of the first cell is good enough, the network node 110 may send a configuration to the wireless device 120, with instructions to perform a measurement of the level of coverage of the primary cell 130 and to send a measurement report relating to this measurement.

When the level of coverage of the primary cell 130 is good enough to start searching for and/or evaluating secondary cells 140 available for the wireless device 120, the network node 110 may send a configuration to the wireless device 120, instructing the wireless device 120 to perform a first measurement of a level of coverage of a secondary cell 140. Example embodiments of methods disclosed herein address scenarios in which the wireless device 120 has been instructed to perform such a first measurement of a level of coverage of a secondary cell 140.

Figure 2:
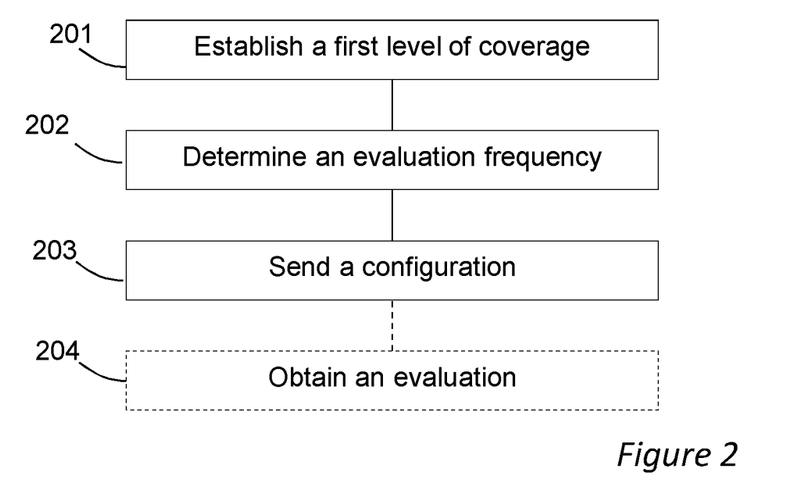
FIG. 2 is a flowchart depicting embodiments of a method in an network node.
Figure 3:
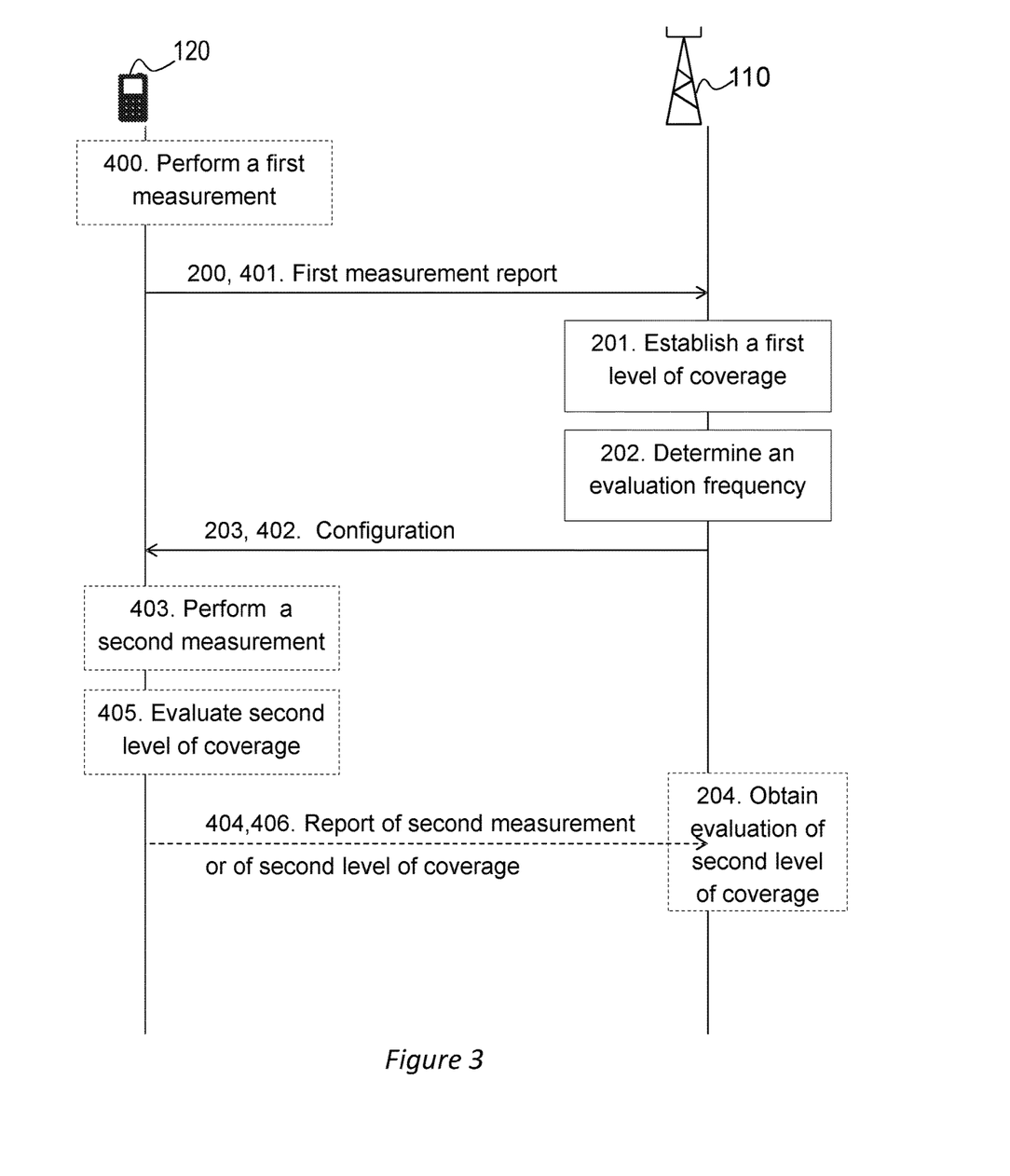
FIG. 3 is a combined signalling diagram and flowchart illustrating embodiments in a wireless network.

Example embodiments of a method in a network node 110 for handling evaluation of a secondary cell 140 for a wireless device 120, will now be described with reference to a flowchart depicted in FIG. 2. The method comprises the following actions, which actions may be taken in any suitable order. Dashed lines of some boxes in FIG. 2 indicate that the corresponding actions are not mandatory. First, the method is described in a general way, here as seen from the network node's point 110 of view, relating to FIG. 2 and FIG. 3. Then, the method will be described as seen from the wireless device's 120 point of view, relating to FIG. 4 and FIG. 3. FIG. 3 is a combined flow chart and signaling diagram, giving an overview of embodiments of a method according to embodiments herein. The method will then be described in more detail below.

Action 201

In order to be able to select an appropriate evaluation frequency the network node 110 needs to know the level of coverage of the secondary cell 140, as seen from the wireless device's point of view. If the level of coverage of the secondary cell 140 is good, the chance of finding a suitable secondary cell 140 is higher than if the level of coverage of the secondary cell 140 is bad. When the chance of finding a suitable secondary cell 140 is high, performing searching and/or evaluation of a secondary cell 140 could be done at a high frequency, whereas it could be a waste of resources and power to perform such searching and/or evaluation when the chance of finding a suitable secondary cell 140 is low.

The network node 110 therefore establishes a first level of coverage of the secondary cell 140, based on a first measurement report received from the wireless device 120. The first measurement report relates to a quality of a signal of the secondary cell 140. The wireless device 120 has thus performed a first measurement relating to a level of coverage or a quality of a signal of the secondary cell 140, and has sent a first measurement report to the network node 110. The wireless device has also received 200 the first measurement report, as illustrated in FIG. 3.

Action 202

The network node 110 determines an evaluation frequency, based on the established first level of coverage of the secondary cell 140. The evaluation frequency relates to how frequently a level of coverage of the secondary cell 140 shall be evaluated.

According to some embodiments, the established level of coverage is compared to a first threshold 501. The first threshold 501 and other exemplary thresholds are further described below, in relation to FIG. 5. In these embodiments, the network node 110 selects a first evaluation frequency 710, when the established level of coverage of the secondary cell 140 is below the first threshold 501. When the established level of coverage of the secondary cell 140 is above the first threshold 501, the network node 110 selects a second evaluation frequency 720. In these embodiments, the second evaluation frequency 720 is higher than the first evaluation frequency 710.

When the established level of coverage is above the first threshold 501, the chance of finding a suitable secondary cell 140 is considered to be higher than if the established level of coverage is below the first threshold 501. As mentioned above, it may be useful to perform searching and/or evaluation of a secondary at a high frequency when the chance of finding a suitable cell is high, whereas it may be a waste of resources and power to perform such searching and/or evaluation when the chance of finding a suitable secondary cell 140 is low. Therefore, selecting a higher evaluation frequency if the established level of coverage is above the first threshold 501, than if the established level of coverage is below the first threshold, may be appropriate.

Action 203

In order to realize the selected evaluation frequency, the network node 110 sends a configuration to the wireless device 120. The configuration relates to an evaluation of a second level of coverage of the secondary cell 140, and is based on the determined evaluation frequency.

In some embodiments, the configuration further relates to configuring the wireless device 120 to perform a second measurement, which second measurement relates to the quality of the signal of the secondary cell 140. Then the second measurement may be used for selection of a new evaluation frequency later on.

In some embodiments, the network node 110 sends the configuration to the wireless device 120 at a frequency corresponding to the determined evaluation frequency. This may be realized by means of using repetition timers.

In some alternative embodiments, the configuration further relates to configuring the wireless device 120 to perform measurements of the quality of the signal of the secondary cell 140 at a frequency corresponding to the determined evaluation frequency. In these embodiments the network node 110 may be considered to delegate a greater responsibility to the wireless device 120 than in the above embodiments, in which the network node 110 sends the configuration to the wireless device 120 at a frequency corresponding to the determined evaluation frequency. An advantage of these embodiments is that they enable a reduced signaling load, combined with an adaptation of the evaluation frequency, since, the network node 110 may send a configuration once, which configuration relates to several measurements to be performed by the wireless device 120, instead of sending several configurations, each of which relates to one action to be performed by the wireless device 120. In some embodiments, the configuration further relates to configuring the wireless device 120 to perform the evaluation of the quality of the signal of the secondary cell 140 at a frequency corresponding to the determined evaluation frequency. In these embodiments even more responsibility is delegated to the wireless device 120, since the wireless device in these embodiments is configured not only to perform measurements of the quality of the signal but also to perform an evaluation of the quality of the signal of the secondary cell. In other embodiments the evaluation is performed by the network node. An advantage of these embodiments is that they enable a reduced signaling load, combined with an adaptation of the evaluation frequency, since, the network node 110 may send a configuration once, which configuration relates to several measurements to be performed by the wireless device 120, instead of sending several configurations, each of which relates to one action to be performed by the wireless device 120

Action 204

In order to be able to select a new evaluation frequency, or to know if the secondary cell 140 can be configured for the wireless device 120, the network node 110 needs to know the second level of coverage of the secondary cell 140. In some embodiments, the network node 110 thus obtains the evaluation of the second level of coverage of the secondary cell 140.

In some of these embodiments the obtaining the evaluation of the second level of coverage is performed by receiving a report of a second measurement from the wireless device 120, which second measurement relates to the quality of the signal of the secondary cell 140. The network node then evaluates the second level of coverage of the secondary cell 140, based on the received report of the second measurement.

In some alternative embodiments the obtaining the evaluation of the second level of coverage comprises receiving an evaluation report from the wireless device 120, which evaluation report relates to the evaluation of the second level of coverage of the secondary cell 140. In these embodiments, the wireless device 120 performs the evaluation of the quality of the signal of the secondary cell and sends an evaluation report, relating to the second level of coverage of the secondary cell, to the network node 110. An advantage of these embodiments is that they enable a reduced signaling load, combined with an adaptation of the evaluation frequency, since the network node 110 may send a configuration once, which configuration relates to both measuring and evaluation of the quality of the signal of the secondary cell.

A method will now be described from a perspective of the wireless device 120. Thus, embodiments of a method in a wireless device 120 for handling evaluation of a secondary cell 140 for the wireless device 120, will be described with reference to a flowchart depicted in FIG. 4, and to the combined flow chart and signaling diagram depicted in FIG. 3. The method comprises the following actions, which actions may be taken in any suitable order. Dashed lines of some boxes in FIG. 4 indicate that the corresponding actions are not mandatory.

Action 401

Figure 4:
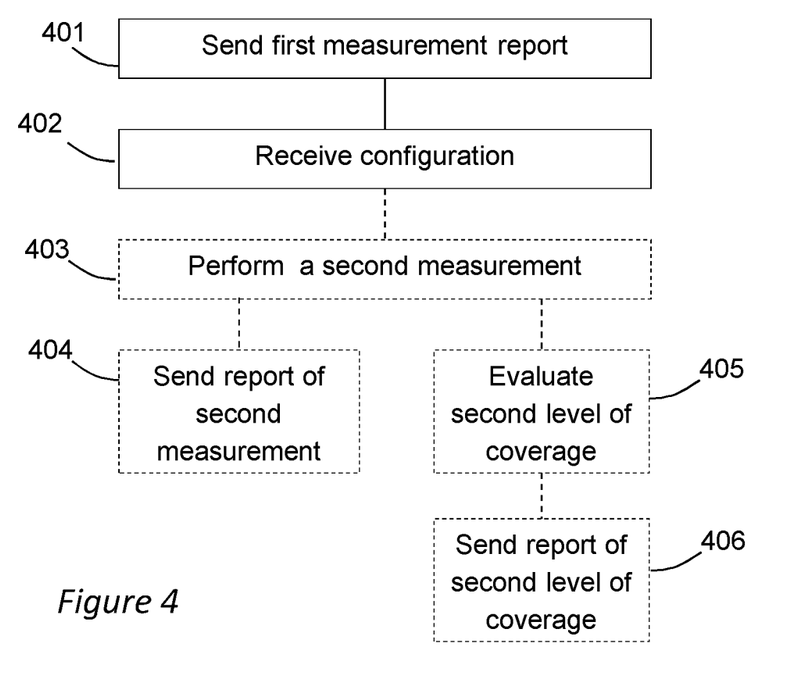
FIG. 4 is a flowchart depicting embodiments of a method in a wireless device.

The wireless device 120 sends a first measurement report to a network node 110, for enabling the network node 110 to establish a first level of coverage of the secondary cell 140, which first measurement report relates to a quality of a signal of the secondary cell 140. The wireless device may thus have performed 400 a first measurement, as illustrated in FIG. 3.

Action 402

The wireless device 120 receives a configuration from the network node 110, which configuration relates to an evaluation of a second level of coverage of the secondary cell 140. The configuration is based on an evaluation frequency, which evaluation frequency is based on the established first level of coverage of the secondary cell 140. The evaluation frequency relates to how frequently a second level of coverage of the secondary cell 140 shall be evaluated.

In some embodiments the evaluation frequency is represented by a first evaluation frequency 710 when the established first level of coverage of the secondary cell 140 is below a first threshold 501, and by a second evaluation frequency 720 when the established first level of coverage of the secondary cell 140 is above the first threshold 501. In these embodiments, the second evaluation frequency 720 is higher than the first evaluation frequency 710.

In some embodiments, the wireless device 120 receives the configuration from the network node 110 with a frequency corresponding to the determined evaluation frequency.

Action 403

In some embodiments, the wireless device 120 performs a second measurement in accordance with the received configuration. The second measurement relates to the quality of the signal of the secondary cell 140.

In some of the embodiments in which the wireless device 120 performs a second measurement, the second measurement is performed at a frequency corresponding to the determined evaluation frequency.

Action 404

In some embodiments, in which a second measurement is performed, the wireless device 120 sends a report of the second measurement to the network node 110, for enabling the network node 110 to evaluate the second level of coverage of the secondary cell 140, based on the report of the second measurement.

Action 405

In some alternative embodiments, in which a second measurement is performed, the wireless device 120 evaluates the second level of coverage of the secondary cell 140, based on the performed second measurement.

In some of the embodiments in which the wireless device 120 evaluates the second level of coverage of the secondary cell 140, the evaluation of the second level of coverage of the secondary cell 140 is performed at a frequency corresponding to the determined evaluation frequency.

Action 406

In some embodiments, in which the wireless device 120 evaluates the second level of coverage of the secondary cell 140, the wireless device 120 sends a report of the evaluated second level of coverage of the secondary cell 140 to the network node 110.

Exemplary embodiments of methods described in a general way above will now be described in more detail. The description below may refer to any embodiment above.

A wireless device 120 may indicate to a network node 110 its capability to support one or more secondary cells 140 in the downlink, as well as one or more secondary cells 140 in the uplink, via RRC signaling.

Before a wireless device 120 may use a secondary cell 140, the network node 110 needs to configure the wireless device 120 with that secondary cell 140. If there are multiple secondary cell selection candidates the network node 110 may either pick one or configure all.

In order to select a secondary cell 140 the network node 110 may either use configuration, statistics or perform specific measurements for the actual wireless device 120.

Once the secondary cell 140 is configured, measurements to search for most suitable secondary cell 140 may be initiated as well as measurements to decide whether the secondary cell 140 should be activated.

Figure 5:
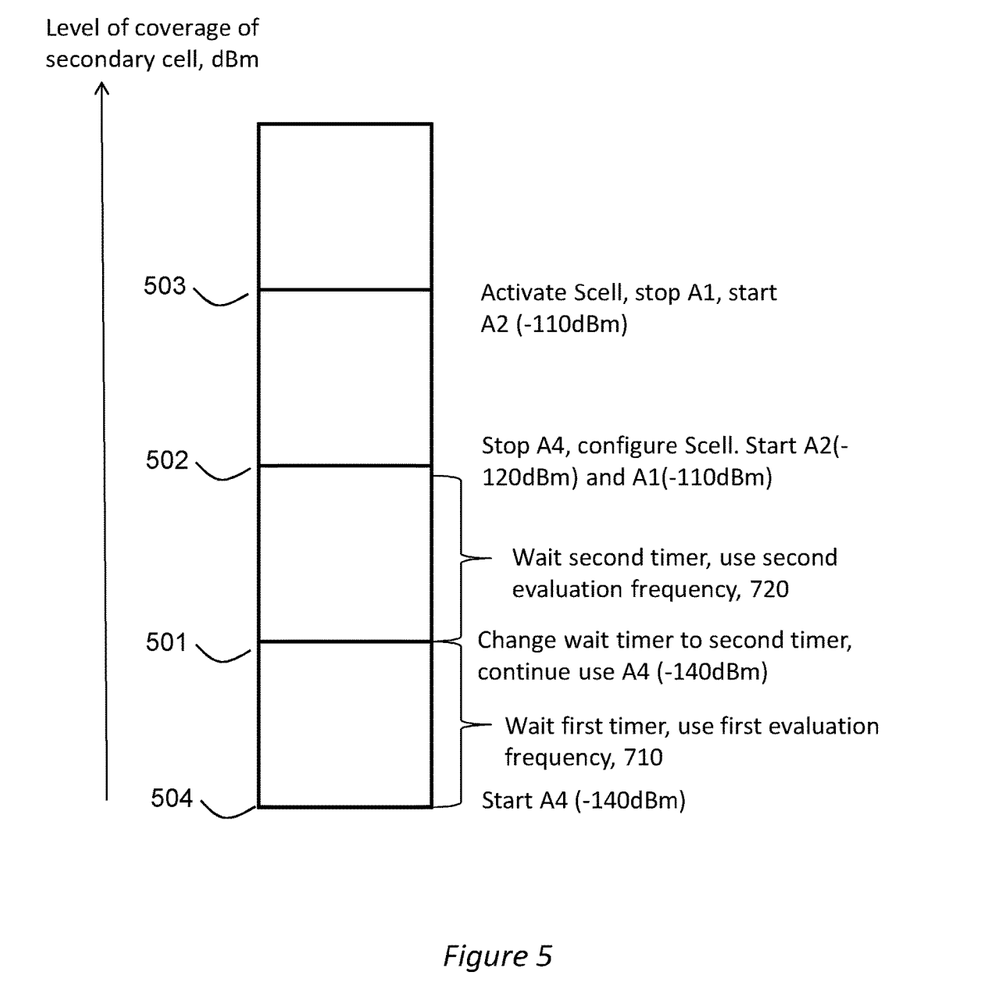
FIG. 5 illustrates thresholds which may be used in some exemplary embodiments herein.

Embodiments herein enable a dynamic measurement intensity based on primary cell 130 coverage and/or secondary cell 140 coverage. This comprises defined triggering points when the search for secondary cells 140 starts, such as a threshold related to a level of coverage of the primary cell, as well as defined triggering points when the search intensity for secondary cells increases or decreases, such as the first threshold 501. In the actions disclosed above the term evaluation frequency corresponds to the measurement intensity as used in this section. Since the evaluation frequency is variable, the measurement intensity is dynamic.

Additionally, there are defined triggering points when the secondary cell 140 should be activated, deactivated or de-configured. This may e.g. imply that a number of thresholds are be defined, and to each of the thresholds, a certain search intensity for secondary cell 140 may be associated. The intensity may be defined through repetition timers Events to be used for triggering the sending of measurement reports, as defined in 3GPP TS 36.331 Release 11, may be used in embodiments herein. Accordingly, the events described below may be used in embodiments herein.

Event A1—Serving Becomes Better than Threshold

The wireless device 120 may consider the entering condition for this event to be satisfied when signal quality of the primary cell 130 is better than a predetermined threshold.

Event A2—Serving Becomes Worse than Threshold

The wireless device 120 may consider the entering condition for this event to be satisfied when signal quality of the primary cell 130 is better than a predetermined threshold.

Event A4—Neighbour Becomes Better than Threshold

In embodiments herein the wireless device 120 considers the entering condition for this event to be satisfied when signal quality of a secondary cell 140 is better than a predetermined threshold.

Upon entering a new primary cell 130, carrier aggregation capable wireless devices, such as the wireless device 120, are supposed to investigate whether the primary cell 130 coverage is good enough to start the search for secondary cells 140. This may be done by configuring the wireless device 120 with an Event A1 measurement. The event threshold of this measurement should correspond to a minimum level of coverage of the primary cell 130, to start the search for potential secondary cells 140. In relation to these measurements, the event threshold connected to the Event A1 measurement is thus a primary cell threshold.

Upon reception of the A1 measurement report relating to the level of coverage of the primary cell 130, the searching for secondary cells 140 may be initiated. The A1 measurement relating to a level of coverage of the primary cell 130 may be terminated at this stage and a corresponding A2 measurement relating to the level of coverage of the primary cell 130 may be started, detecting if the level of coverage becomes too bad again.

An exemplary embodiment of different thresholds to be used for selecting an appropriate evaluation frequency is depicted in FIG. 5. The boxes shown in FIG. 5 illustrate different levels of coverage of the secondary cell 140, as seen from the wireless device's 120 point of view, and the borders between the boxes illustrate possible thresholds to be used in embodiments herein.

Upon entering good enough coverage of the primary cell 130 for the secondary cell 140 search to start, the network node 110 may configure the wireless device 120 with an Event A4 measurement, "neighbor becomes better than threshold". This measurement could be started for either one potential secondary cell frequency or multiple frequencies. The threshold related to the Event A4 measurement may be referred to as a start threshold 504. This start threshold 504 thus relates to a level of coverage of the secondary cell 140. The start threshold 504 may configured to be so low that it is more or less guaranteed that a measurement report will be received, e.g. −140 dBm. According to some embodiments, the start threshold 504 is chosen from the range between −145 dBm and −130 dBm. The first measurement performed by the wireless device relates to action 400 above. The sending of this first measurement report relates to action 401 above. Reception of the first measurement report relates to action 200 above. This first measurement report relates to the signal quality of the secondary cell 140, as experienced by the wireless device 120.

The text below relates to action 201 above.

Upon reception of the A4 measurement report the network node 110 checks the level of coverage of the secondary cell 140. The network node 110 thus establishes a level of coverage of the secondary cell 140 based on this first measurement report received from the wireless device 120.

The network node 110 determines an evaluation frequency, based on the established first level of coverage of the secondary cell 140. The evaluation frequency relates to how frequently a level of coverage of the secondary cell 140 shall be evaluated. According to some embodiments herein various timers are used to generate different delays corresponding to different evaluation frequencies.

The text below relates to action 202 above.

When timers are used, the network node 110 may do the following, depending on the established level of coverage:

The established level of coverage may be compared to one of several thresholds. When the established level of coverage is below a first threshold 501, the Event A4 measurement may be stopped and a first timer may be started. This corresponds to the network node 110 selecting a first evaluation frequency 710, when the established level of coverage of the secondary cell 140 is below the first threshold 501, as described above.

In an exemplary embodiment the first threshold is −130 dBm. According to some embodiments, the first threshold 501 is chosen from the range between −140 dBm and −120 dBm.

Upon timeout of the first timer, the Event A4 may be restarted and the network node 110 will send a configuration to the wireless device 120, which configuration instructs the wireless to perform a new measurement of the level of coverage of the secondary cell 140 and to send a second measurement report to the network node 110. The sending of the configuration relates to action 203 above. The performing of a second measurement relates to action 403 as described above. The sending of the second measurement report relates to action 404 described above.

When the established level of coverage is above the first threshold 501, the Event A4 measurement may be stopped and a second timer may be started. This corresponds to the network node 110 selecting a second evaluation frequency 720, when the established level of coverage of the secondary cell 140 is above the first threshold 501, as described above.

Upon timeout of the second timer, the Event A4 may be restarted and the network node 110 will send a configuration to the wireless device 120, which configuration instructs the wireless to perform a new measurement of the level of coverage of the secondary cell 140 and to send a second measurement report to the network node 110. The sending of the configuration relates to action 203 above. The performing of a second measurement relates to action 403 as described above. The sending of the second measurement report relates to action 404 described above.

The second timer defines a delay which is shorter than a delay defined by the first timer. This corresponds to the second evaluation frequency 720 being higher than the first evaluation frequency 710, as described above.

According to some embodiments, the Event A4 measurement may be stopped and the second timer started, only if the established level of coverage is above the first threshold 501, and below a second threshold 502. In an exemplary embodiment the second threshold 502 is −120 dBm. According to some embodiments, the second threshold 502 is chosen from the range between −130 dBm and −110 dBm. If the established level of coverage is above the second threshold 502 as well, this means that the level of coverage of the secondary cell 140 is good enough to configure secondary cell 140, such that it may later be activated and may be used by the wireless device 120. The secondary cell 140 may thus be configured, the Event A4 measurement may be stopped and an Event A1 measurement may be started on the secondary cell 140. A third threshold 503 may be associated with the Event A1 measurement of the secondary cell 140. In an exemplary embodiment the second threshold 503 is −110 dBm. According to some embodiments, the third threshold 503 is chosen from the range between −120 dBm and −100 dBm Additional timers and thresholds may be used so as to achieve a finer granularity.

When an Event A1 measurement has been be started on the secondary cell 140, and the network node 110 receives an Event A1 on the secondary cell 140, this means that the coverage so good that the secondary cell 140 may be activated. As depicted in FIG. 5, this means that the level of coverage of the secondary cell 140 is above the third threshold 503. The activation of the secondary cell 140 may be combined with the start an Event A2 on the secondary cell 140, which monitors if the coverage becomes too poor again for the secondary cell 140 to be deactivated. Also, the Event A1 measurement is stopped.

In a corresponding manner, the events and thresholds disclosed above may be used in a scenario where the wireless device 120 is in a state where the secondary cell 140 is activated. Then, there may be an Event A2 measurement active monitoring the coverage of the secondary cell 140.

In this case, reception of Event A2 on the activated secondary cell 140 means that the coverage of the secondary cell 140 is so poor that the secondary cell 140 should be deactivated. This is combined with the start of an Event A1 on the secondary cell 140, which monitors if the coverage becomes good enough again for the secondary cell 140 to be activated as well as the start of an Event A2 on the secondary cell 140, which monitors if the coverage becomes too poor again for the secondary cell 140 to be de-configured.

Reception of Event A1 on Secondary Cell 140

Upon reception of Event A1 on secondary cell, the steps needed to activate the secondary cell again may be performed.

Reception of Event A2 on Configured Secondary Cell.

The event A4 is restarted and the algorithm described above, in relation to FIG. 2, FIG. 3 and FIG. 4, may be repeated.

Concurrently with the above described secondary cell measurement, the wireless device 120 also monitors the primary cell 130 using an event A2 measurement. If primary cell coverage becomes too poor the A2 measurement will report. If that happens the secondary cell search may be aborted.

Figure 6:
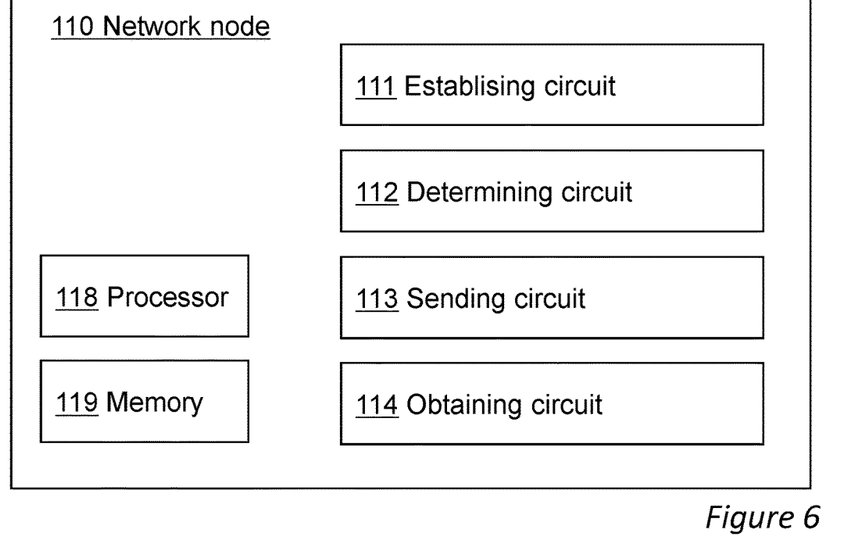
FIG. 6 is a schematic block diagram illustrating embodiments of an network node.

The network node 110 configured to perform the method actions for handling evaluation of a secondary cell 140 for a wireless device 120, as described above in relation to FIG. 2, is depicted in FIG. 6.

The network node 110 is configured to establish a first level of coverage of the secondary cell 140, based on a first measurement report received from the wireless device 120, which first measurement report relates to a quality of a signal of the secondary cell 140. In some embodiments, the network node 110 comprises an establishing circuit 111 configured to establish a first level of coverage of the secondary cell 140, based on a first measurement report received from the wireless device 120, which first measurement report relates to a quality of a signal of the secondary cell 140.

The network node 110 is further configured to determine an evaluation frequency, based on the established first level of coverage of the secondary cell 140. The evaluation frequency relates to how frequently a level of coverage of the secondary cell shall be evaluated. In some embodiments, the network node 110 comprises a determining circuit 112 configured to determine the evaluation frequency, based on the established first level of coverage of the secondary cell 140, which evaluation frequency relates to how frequently a level of coverage of the secondary cell 140 shall be evaluated.

The network node 110 is further configured to send a configuration to the wireless device 120, which configuration relates to an evaluation of a second level of coverage of the secondary cell 140, and which configuration is based on the determined evaluation frequency. In some embodiments, the network node 110 comprises a sending circuit 113 configured to send the configuration to the wireless device 120, which configuration relates to an evaluation of a second level of coverage of the secondary cell 140, and which configuration is based on the determined evaluation frequency.

According to some embodiments, the network node 110 is configured to obtain the evaluation of the second level of coverage of the secondary cell. In some embodiments, the network node 110 comprises an obtaining circuit 114 configured to obtain the evaluation of the second level of coverage of the secondary cell 140.

According to some embodiments the network node 110 is further configured to receive a report of a second measurement from the wireless device 120, which second measurement relates to the quality of the signal of the secondary cell 140, and to evaluate the second level of coverage of the secondary cell 140, based on the received report of the second measurement. In some embodiments, the network node 110 comprises a receiving circuit configured to receive a report of a second measurement from the wireless device 120, which second measurement relates to the quality of the signal of the secondary cell 140. The obtaining circuit 114 may then be configured to evaluate the second level of coverage of the secondary cell 140 based on the received report of the second measurement.

According to some alternative embodiments, the network node 110 is further configured to receive an evaluation report from the wireless device 120, in order to obtain the evaluation of the second level of coverage, which evaluation report relates to the evaluation of the second level of coverage of the secondary cell 140. In some embodiments, the network node 110 comprises a receiving circuit configured to receive the evaluation report from the wireless device 120, which evaluation report relates to the evaluation of the second level of coverage of the secondary cell.

According to some embodiments, the network node 110 is configured to select a first evaluation frequency 710 when the established level of coverage of the secondary cell 140 is below a first threshold 501, and to select a second evaluation frequency 720 when the established level of coverage of the secondary cell 140 is above the first threshold 501, the second evaluation frequency 720 being higher than the first evaluation frequency 710. The determining circuit 112 described above may then be configured to select a first evaluation frequency 710 when the established level of coverage of the secondary cell 140 is below a first threshold 501, and to select a second evaluation frequency 720 when the established level of coverage of the secondary cell 140 is above the first threshold 501, the second evaluation frequency 720 being higher than the first evaluation frequency 710.

According to some embodiments, the network node 110 is configured to configure the wireless device 120 to perform a second measurement, which second measurement relates to the quality of the signal of the secondary cell 140.

According to some embodiments, the network node 110 is configured to send the configuration to the wireless device 120 at a frequency corresponding to the determined evaluation frequency. In these embodiments, the sending circuit 113 described above may be configured to send the configuration to the wireless device 120 at a frequency corresponding to the determined evaluation frequency.

According to some alternative embodiments, the network node 110 is configured to configure the wireless device 120 to perform measurements of the quality of the signal of the secondary cell 140 at a frequency corresponding to the determined evaluation frequency.

According to some embodiments, the network node 110 is configured to configure the wireless device 120 to perform the evaluation of the quality of the signal of the secondary cell 140 at a frequency corresponding to the determined evaluation frequency.

The embodiments herein for handling evaluation of a secondary cell 140 for a wireless device 120, may be implemented through one or more processors, such as a processor 118 in the network node 110 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110

The network node 110 may further comprise a memory 119 comprising one or more memory units. The memory 119 is arranged to be used to store indications, metrics, determined measures of the downlink interference, cell parameters, configurations, and applications to perform the methods herein when being executed in the network node 110.

Those skilled in the art will also appreciate that the establishing circuit 111, determining circuit 112, sending circuit 113, and obtaining circuit 114 described above may refer to a combination of analog and digital circuits, and/or one or more processors configured with software and/or firmware, e.g. stored in a memory, that when executed by the one or more processors such as the processor 118 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Figure 7:
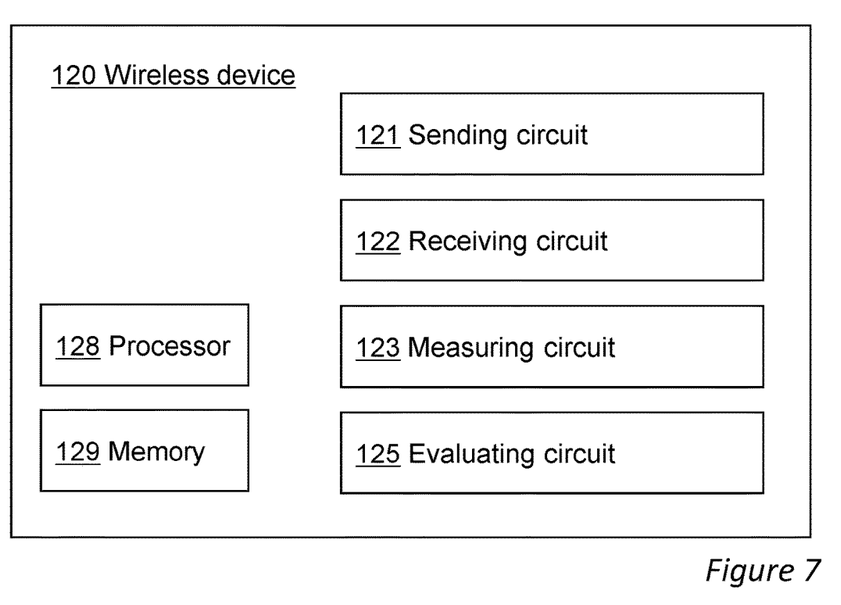
FIG. 7 is a schematic block diagram illustrating embodiments of wireless device.

The wireless device 120 configured to perform the method actions for handling evaluation of a secondary cell 140 for the wireless device 120, as described above in relation to FIG. 4, is depicted in FIG. 7.

The wireless device 120 is configured to send a first measurement report to a network node 110, for enabling the network node 110 to establish a first level of coverage of the secondary cell 140, which first measurement report relates to a quality of a signal of the secondary cell 140. In some embodiments, the wireless device 120 comprises a sending circuit 121 configured to send the first measurement report to the network node 110.

The wireless device 120 is furthermore configured to receive a configuration from the network node 110, which configuration relates to an evaluation of a second level of coverage of the secondary cell 140, and which configuration is based on an evaluation frequency, which evaluation frequency is based on the established first level of coverage of the secondary cell 140, and which evaluation frequency relates to how frequently a second level of coverage of the secondary cell 140 shall be evaluated. In some embodiments, the wireless device 120 comprises a receiving circuit 122 configured to receive the configuration from the network node 110.

In some embodiments, the wireless device 120 is further configured to perform a second measurement in accordance with the received configuration, which second measurement relates to the quality of the signal of the secondary cell 140. In some embodiments, the wireless device 120 comprises a measuring circuit 123, configured to perform the second measurement.

In some of the embodiments in which the wireless device 120 is configured to perform a second measurement, the wireless device 120 is further configured to send a report of the second measurement to the network node 110, for enabling the network node 110 to evaluate the second level of coverage of the secondary cell 140, based on the report of the second measurement. The above mentioned sending circuit 121 may then be configured to send the report of the second measurement to the network node 110.

In some other of the embodiments in which the wireless device 120 is configured to perform a second measurement, the wireless device 120 is further configured to evaluate the second level of coverage of the secondary cell 140, based on the performed second measurement, and send to the network node 110, a report of the evaluated second level of coverage of the secondary cell 140. In some embodiments, the wireless device 120 comprises an evaluating circuit 125 configured to evaluate the second level of coverage of the secondary cell 140. The above mentioned sending circuit 121 may be configured to send the report of the evaluated second level of coverage of the secondary cell 140 to the network node 110.

In some embodiments, the evaluation frequency is represented by a first evaluation frequency 710 when the established first level of coverage of the secondary cell 140 is below a first threshold 501, and by a second evaluation frequency 720 when the established first level of coverage of the secondary cell 140 is above the first threshold 501. In these embodiments, the second evaluation frequency 720 being higher than the first evaluation frequency 710.

In some embodiments the wireless device 120 is further configured to receive the configuration from the network node 110, at a frequency corresponding to the determined evaluation frequency. The above mentioned receiving circuit 122 may then be configured to receive the configuration from the network node 110, at a frequency corresponding to the determined evaluation frequency.

In some embodiments the wireless device 120 is further configured to perform a second measurement and/or to evaluate the second level of coverage of the secondary cell 140 at a frequency corresponding to the determined evaluation frequency. The above mentioned measuring circuit 123 may be configured to perform the second measurement at a frequency corresponding to the determined evaluation frequency. The above mentioned evaluating circuit 125 may be configured to evaluate the second level of coverage of the secondary cell 140 at a frequency corresponding to the determined evaluation frequency.

The embodiments herein for handling evaluation of a secondary cell 140 for a wireless device 120, may be implemented through one or more processors, such as a processor 128 in the wireless device 120 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the in the wireless device 120. One such carrier may be in the form of a CD ROM disc. It is however feasible with other data carriers such as a memory stick. The computer program code may furthermore be provided as pure program code on a server and downloaded to the wireless device 120.

The wireless device 120 may further comprise a memory 129 comprising one or more memory units. The memory 129 is arranged to be used to store indications, metrics, determined measures of the downlink interference, cell parameters, configurations, and applications to perform the methods herein when being executed in the wireless device 120.

Those skilled in the art will also appreciate that the sending circuit 121, receiving circuit 122, measuring circuit 123, and evaluating circuit 125 described above may refer to a combination of analog and digital circuits, and/or one or more processors configured with software and/or firmware, e.g. stored in a memory, that when executed by the one or more processors such as the processor 128 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for handling evaluation of a secondary cell for a wireless device, the method comprising:
   establishing a first level of coverage of the secondary cell, based on a first measurement report received from the wireless device, which first measurement report relates to a quality of a signal of the secondary cell,
   determining an evaluation frequency, based on the established first level of coverage of the secondary cell, which evaluation frequency relates to how frequently a level of coverage of the secondary cell shall be evaluated, and
   sending a configuration to the wireless device, which configuration causes an evaluation of a second level of coverage of the secondary cell to be performed at a frequency corresponding to the determined evaluation frequency.

2. The method according to claim 1, furthermore comprising obtaining the evaluation of the second level of coverage of the secondary cell.

3. The method according to claim 2, wherein the obtaining the evaluation of the second level of coverage is performed by
   receiving a report of a second measurement from the wireless device, which second measurement relates to the quality of the signal of the secondary cell, and
   evaluating the second level of coverage of the secondary cell, based on the received report of the second measurement.

4. The method according to claim 2, wherein the obtaining the evaluation of the second level of coverage comprises receiving an evaluation report from the wireless device, which evaluation report relates to the evaluation of the second level of coverage of the secondary cell.

5. The method according to claim 1, wherein determining the evaluation frequency comprises,
   when the established level of coverage of the secondary cell is below a first threshold, selecting a first evaluation frequency,
   when the established level of coverage of the secondary cell is above the first threshold, selecting a second evaluation frequency,
   wherein the second evaluation frequency is higher than the first evaluation frequency.

6. The method according to claim 1 wherein the configuration further relates to configuring the wireless device to perform a second measurement, which second measurement relates to the quality of the signal of the secondary cell.

7. The method according to claim 1, wherein sending the configuration to the wireless device is performed with a frequency corresponding to the determined evaluation frequency.

8. The method according to claim 1, wherein the configuration further relates to configuring the wireless device to perform measurements of the quality of the signal of the secondary cell at a frequency corresponding to the determined evaluation frequency.

9. The method according to claim 1 wherein the configuration further relates to configuring the wireless device to perform the evaluation of the quality of the signal of the secondary cell at a frequency corresponding to the determined evaluation frequency.

10. A network node for handling evaluation of a secondary cell for a wireless device, wherein the network node is configured to:
    establish a first level of coverage of the secondary cell, based on a first measurement report received from the wireless device, which first measurement report relates to a quality of a signal of the secondary cell,
    determine an evaluation frequency, based on the established first level of coverage of the secondary cell, which evaluation frequency relates to how frequently a level of coverage of the secondary cell shall be evaluated, and
    send a configuration to the wireless device, which configuration causes an evaluation of a second level of coverage of the secondary cell to be performed at a frequency corresponding to the determined evaluation frequency.

11. The network node according to claim 10, further being configured to
    obtain the evaluation of the second level of coverage of the secondary cell.

12. The network node according to claim 11, further being configured to
    receive a report of a second measurement from the wireless device, which second measurement relates to the quality of the signal of the secondary cell, and
    evaluate the second level of coverage of the secondary cell, based on the received report of the second measurement.

13. The network node according to claim 11, further being configured to
    receive an evaluation report from the wireless device, in order to obtain the evaluation of the second level of coverage, which evaluation report relates to the evaluation of the second level of coverage of the secondary cell.

14. The network node according to claim 10, further being configured to
    select a first evaluation frequency when the established level of coverage of the secondary cell is below a first threshold,
    select a second evaluation frequency when the established level of coverage of the secondary cell is above the first threshold,
    the second evaluation frequency being higher than the first evaluation frequency.

15. The network node according to claim 10, further being configured to
    configure the wireless device to perform a second measurement, which second measurement relates to the quality of the signal of the secondary cell.

16. The network node according to claim 10, further being configured to
    send the configuration to the wireless device at a frequency corresponding to the determined evaluation frequency.

17. The network node according to claim 10, further being configured to
    configure the wireless device to perform measurements of the quality of the signal of the secondary cell at a frequency corresponding to the determined evaluation frequency.

18. The network node according to claim 10, further being configured to
    configure the wireless device to perform the evaluation of the quality of the signal of the secondary cell at a frequency corresponding to the determined evaluation frequency.

* * * * *